(12) United States Patent
Bacou et al.

(10) Patent No.: US 11,960,129 B2
(45) Date of Patent: Apr. 16, 2024

(54) OPTICAL EMITTER-RECEIVER MODULE

(71) Applicant: LATELEC, Toulouse (FR)

(72) Inventors: Alexandre Bacou, Saint Porquier (FR); Georges Zissis, Toulouse (FR); Jérôme Pauc, Toulouse (FR)

(73) Assignee: LATELEC, Toulouse (FR)

( * ) Notice: Subject to any disclaimer, the term of this patent is extended or adjusted under 35 U.S.C. 154(b) by 25 days.

(21) Appl. No.: 17/784,984

(22) PCT Filed: Dec. 18, 2020

(86) PCT No.: PCT/EP2020/087112
§ 371 (c)(1),
(2) Date: Jun. 13, 2022

(87) PCT Pub. No.: WO2021/130127
PCT Pub. Date: Jul. 1, 2021

(65) Prior Publication Data
US 2023/0003954 A1        Jan. 5, 2023

(30) Foreign Application Priority Data

Dec. 23, 2019    (FR) .................................... 1915411

(51) Int. Cl.
*G02B 6/42*        (2006.01)
*H04B 10/40*       (2013.01)

(52) U.S. Cl.
CPC ......... *G02B 6/4214* (2013.01); *G02B 6/4246* (2013.01); *G02B 6/4298* (2013.01); *H04B 10/40* (2013.01)

(58) Field of Classification Search
CPC .. G02B 6/4214; G02B 6/4246; G02B 6/4298; H04B 10/40
See application file for complete search history.

(56) References Cited

U.S. PATENT DOCUMENTS 5,854,865 A  *  12/1998  Goldberg ............ H01S 3/06708
                                              372/6
6,124,956 A  *   9/2000  Severn ................. G02B 6/4246
                                              398/1

(Continued)

FOREIGN PATENT DOCUMENTS

EP    0974856 A2    1/2000
EP    1795930 A1    6/2007

(Continued)

*Primary Examiner* — Thanh Luu
*Assistant Examiner* — Monica T Taba
(74) *Attorney, Agent, or Firm* — H&I PARTNERS; Chai Im; C. Andrew Im

(57) ABSTRACT

An optical emitter-receiver module includes a light source, a photodetector and a fiber. The light source emits an emitted beam. The fiber includes a core and an optical axis. The fiber has an outer surface, inclined at an angle of 45° with respect to the optical axis, having a mirror. The fiber has a notch, extending to the core of the fiber and having a face having a dichroic filter for reflecting a received beam. The light source is arranged relative to the mirror so that the emitted beam is reflected by the mirror and transmitted in the fiber. The photodetector and the face of the notch are positioned so that the received beam reflected by the dichroic filter is directed towards the photodetector.

7 Claims, 3 Drawing Sheets

(56) References Cited

U.S. PATENT DOCUMENTS

| | | | |
|---|---|---|---|
| 6,406,196 B1 | 6/2002 | Uno et al. | |
| 2002/0131727 A1 | 9/2002 | Reedy et al. | |
| 2002/0172459 A1* | 11/2002 | Bailey | G02B 6/2817 |
| | | | 385/33 |
| 2003/0152336 A1 | 8/2003 | Gurevich et al. | |
| 2004/0213516 A1* | 10/2004 | Gordon | H04B 10/40 |
| | | | 385/32 |
| 2012/0020383 A1 | 1/2012 | Shimizu et al. | |

FOREIGN PATENT DOCUMENTS

| | | |
|---|---|---|
| WO | 02075402 A1 | 9/2002 |
| WO | 03010579 A1 | 2/2003 |

\* cited by examiner

OPTICAL EMITTER-RECEIVER MODULE

RELATED APPLICATIONS

This application is a § 371 application of PCT/EP2020/087112 filed Dec. 18, 2020, which claims priority from French Patent Application No. 1915411 filed Dec. 23, 2019, each of which is incorporated herein by reference in its entirety.

FIELD OF THE INVENTION

The present invention concerns an optical emitter-receiver module.

The invention may particularly be used for optical communications or also for providing lighting.

The invention advantageously applies in the aeronautical field, particularly to equip an aircraft.

BACKGROUND OF THE INVENTION

Optical emitter-receiver modules are usually designated under the name "Transceiver", a contraction of "TRANSmitter" and "reCEIVER". Transceivers conventionally comprise an emitting portion and a receiving portion. The emitting portion particularly comprises a light source emitting a light beam and a first optical device configured to ensure the optical coupling of the light beam in a first optical fiber. The receiving portion particularly comprises a second optical device configured to ensure the coupling of a beam received by a second optical fiber on a photodetector. In the aeronautical field in particular, these transceivers, using two optical fibers, have certain drawbacks, particularly in terms of costs, size, installation and management of the associated maintenance.

In order to overcome these drawbacks, one solution involves coupling the light beams emitted and received respectively by the light source and the photodetector in one and the same optical fiber. An optical device shared by the light source and the photodetector makes it possible to couple and separate the light beams emitted and those received circulating in the optical fiber.

There are many solutions for producing such a shared optical device. It is possible particularly to use a semi-reflective plate provided with a dichroic filter. However, the optimal optical coupling is not guaranteed, the light source and the photodetector being at a distance from the end of the optical fiber and the light beams emitted or received pass through many optical components (lenses, filter, etc.). In addition, the implementation of this solution involves, in order to hold in position the various optical components, many mechanical parts that must be machined with a high precision. On the other hand, the transceiver obtained is voluminous.

It is possible to replace the semi-reflective plate with an optical coupler, an optical circulator or also a wavelength multiplexer/demultiplexer. The transceivers obtained however remain voluminous. The integration of a large number of such transceivers into a reduced environment is therefore not possible.

OBJECT AND SUMMARY OF THE INVENTION

The aim of the present invention is to remedy the aforementioned drawbacks.

To this end, it is proposed by the present invention an optical emitter-receiver module that makes it possible to separate the light beams emitted and those received.

The optical emitter-receiver module comprises a first light source, a first photodetector and a multimode glass optical fiber. The first light source is configured to emit a first emitted beam at a first wavelength. The optical fiber comprises a core, an optical cladding, an optical axis, and has:
  a first end surface, inclined at an angle of 45° with respect to the optical axis of the optical fiber, comprising a mirror,
  a first notch, extending from an outer surface of the optical cladding to the core of the optical fiber, and having a first face comprising a first dichroic filter configured to reflect a light beam of wavelength equal to a second wavelength, different from the first wavelength, called first received beam.

The first light source is arranged relative to the mirror such that the first emitted beam emitted by said first light source passes through the optical cladding, is reflected by the mirror and is transmitted in the optical fiber.

The first photodetector and the first face of the first notch are positioned relative to one another such that the first received beam reflected by the first dichroic filter passes through the optical cladding and is directed towards the first photodetector.

The optical emitter-receiver module according to the invention advantageously only comprises a light source, a photodetector and an optical fiber on the one hand to couple a light beam, called first emitted beam, from the first light source in the optical fiber and on the other hand to couple a light beam, called first received beam, coming from said fiber on the first photodetector.

Instead of using external optical components to perform the couplings of the various light beams, first emitted beam and first received beam, the optical fiber itself is used.

This particularly simple configuration thus does not require additional optical components, the geometrical configuration ensuring the transmission and the reception of the first emitted beam and of the first received beam.

The optical fiber is advantageously positioned as close as possible to the optical components that are the first light source and the first photodetector and to guarantee an efficient optical coupling.

Such a configuration makes it possible to produce an optical emitter-receiver module according to the invention of small volume and at low cost. The integration of a large number of these optical emitter-receiver modules into reduced environments is possible.

According to particular implementations, the optical emitter-receiver module according to the invention further meets the following features, implemented alone or in each of the technically operating combinations thereof.

In preferred embodiments of the invention, the optical fiber comprises a second notch, extending from an outer surface of the optical cladding to the core of the optical fiber, and having a first face comprising a second dichroic filter configured to reflect a light beam at a third wavelength, different from the first wavelength and from the second wavelength.

In examples of embodiments, the optical emitter-receiver module comprises a second light source configured to emit a light beam at a third wavelength, called second emitted beam. The second light source and the first face of the second notch are positioned relative to one another such that the second emitted beam emitted by the second light source passes through the optical cladding, is reflected by the second dichroic filter and is transmitted in the optical fiber.

Preferably, the first light source, the first photodetector and the second light source are disposed in a same plane. Such an arrangement makes it possible to further reduce the size of the optical emitter-receiver module.

In other examples of embodiments, the optical emitter-receiver module comprises a second photodetector configured to detect a light beam at a third wavelength, the second photodetector and the first face of the second notch are positioned relative to one another such that the light beam at the third wavelength reflected by the second dichroic filter passes through the optical cladding and is directed towards the second photodetector.

Preferably, the first light source, the first photodetector and the second photodetector are disposed in a same plane. Such an arrangement makes it possible to further reduce the size of the optical emitter-receiver module.

In alternative embodiments, the optical fiber may have a cut separating it into two adjacent sections, one of the faces opposite the cut comprising a dichroic filter configured to reflect a light beam at a predefined wavelength. This cut may replace one of the notches described above.

In embodiments, the first notch or the second notch, or the cut is produced by micro-machining the optical fiber.

The optical fiber used being a multimode optical fiber, its core is wide enough to make it possible to perform micro-machining there.

The micro-machining of the optical fiber may be performed, for example with the aid of a pulse power laser.

BRIEF DESCRIPTION OF THE FIGURES

The invention will be better understood upon reading the following description, given by way of non-limiting example, and made in reference to the figures that show.

DETAILED DESCRIPTION OF AN EMBODIMENT OF THE INVENTION

Figure 1:
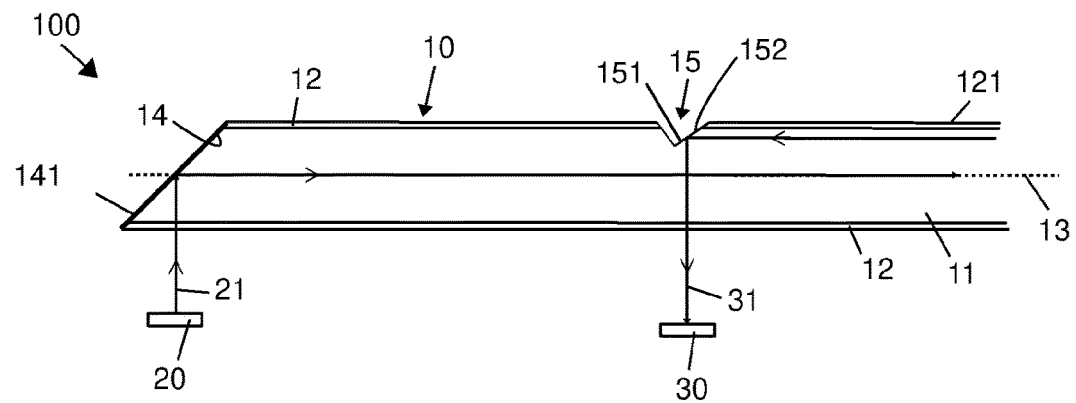
FIG. 1 is a schematic representation, in sectional view, of an optical transceiver according to a first example of embodiment of the invention.

FIG. 1 illustrates in a very schematic manner, and in sectional view, a first example of an optical emitter-receiver module according to the invention.

In the remainder of the description, an optical emitter-receiver module will be named optical transceiver 100.

The optical transceiver 100 comprises an optical fiber 10, a first light source 20 and a first photodetector 30.

FIG. 1 shows a longitudinal sectional view of a portion of the optical fiber 10.

The optical fiber 10 comprises, conventionally, a core 11 and an optical cladding 12. The optical cladding 12 is in contact with the core 11 and surrounds it. The optical cladding 12 has a refractive index lower than a refractive index of the core 11.

The optical fiber 10 used is preferably a multimode optical fiber. It thus has a core 11 of large diameter. It is preferably made of glass, based on silica.

The optical fiber 10 has an optical axis 13 that follows the centre of the core 11 of the optical fiber 10.

The optical fiber 10 comprises a first end surface 14. The first end surface 14 is inclined at an angle with respect to the optical axis 13 of the optical fiber 10. Advantageously, the angle of the first end surface 14 is substantially equal to 45°.

The inclination of the first end surface 14 of the optical fiber 10 may for example be produced by polishing or cleavage.

The first end surface 14 comprises a mirror 141. The mirror 141 is arranged to reflect light beams propagating in the optical fiber 10.

According to the invention, the mirror 141 is intended to be optically coupled with the first light source 20.

The first light source 20 is configured to emit a light beam, called first emitted beam.

The first light source 20 is preferably a monochromatic source. The first emitted beam is for example emitted at a wavelength $\lambda_1$.

In a preferred example of embodiment, the first emitted beam at the output of the first light source 20 is a divergent beam and is in the form of a diffusion cone.

In an alternative embodiment, a lens may be disposed at the output of the first light source 20, to collimate the first emitted beam.

Generally, any light source may be used for the first light source 20, such as for example light-emitting diodes (known under the acronym LED) or laser sources, such as the laser diodes or vertical-cavity surface-emitting laser, commonly known under the acronym VCSEL. Nevertheless, advantageously preference will be given to the use of surface-emitting light sources, such as the LED or the VCSEL.

The first light source 20 is intended to be positioned facing the optical cladding 12 of the optical fiber 10. The first light source 20 is arranged relative to the mirror 141 such that the first emitted beam, after having passed through the optical cladding 12, is directed towards the mirror 141 to be reflected there and subsequently to propagate in the core 11 of the optical fiber 10.

In FIG. 1, in the interest of clarity, only one ray 21 of the first emitted beam is shown, in this case that located on a central axis of the first emitted beam. An arrow indicates the direction of propagation of this ray 21.

The first light source 20 is arranged for example, and as illustrated in FIG. 1, so that said ray located on the central axis of the first emitted beam has, at the mirror 141, an angle substantially of 90° with the optical axis 13 of the optical fiber 10. Thus, the ray 21 of the first emitted beam, after reflection on the mirror 141, is transmitted in the optical fiber 10 substantially in the optical axis 13 of said optical fiber.

The first light source 20 is preferably positioned relative to the optical fiber 10 so that the set of rays forming the first emitted beam, regardless of whether it is divergent or collimated, is totally reflected by the mirror 141. Such an arrangement of the first light source 20 opposite the optical fiber 10 makes it possible to transmit the first emitted beam in the optical fiber 10 with an optimal coupling.

The optical fiber 10 further comprises a first notch 15, preferably produced at a distance from the first end surface 14.

The first notch 15 is preferably a transverse notch, that is to say that it is produced in a direction substantially perpendicular to the longitudinal direction of the optical fiber 10.

The first notch 15 extends from an outer surface 121 of the optical cladding 12 to the core 11 of the optical fiber 10.

In the preferred but non-limiting example of FIG. 1, the first notch 15 has a V-shaped straight section.

The first notch 15 comprises a first face 151 inclined with respect to the optical axis 13 of the optical fiber 10.

The first face 151 of the first notch 15 comprises a dichroic filter, called first dichroic filter 152. This first dichroic filter 152 is advantageously configured to reflect a light beam of wavelength $\lambda_2$, called first received beam, coming from the optical fiber 10, towards the photodetector, as illustrated in FIG. 1. In the interest of clarity, only the propagation of an arbitrary ray 31 of the first received beam is shown in this figure. An arrow indicates the direction of propagation of this ray 31.

The wavelength $\lambda_2$ of the first received beam is different from the wavelength $\lambda_1$ of the first emitted beam.

The first dichroic filter 152 of the first notch 15 is also advantageously configured to allow the first emitted beam, of wavelength $\lambda_1$, to pass through.

The first face 151 of the first notch 15 is optically coupled with the first photodetector 30. The first photodetector 30 is positioned facing the optical cladding 12 of the optical fiber 10.

The first photodetector 30 is disposed opposite the optical fiber 10 substantially diametrically opposite the first notch 15 produced in the optical fiber 10.

The first photodetector 30 is advantageously configured to detect the first received beam reflected by the first dichroic filter 152.

The first face 151 of the first notch 15 is inclined, with respect to the optical axis 13 of the optical fiber 10, such that the first received beam coming from the optical fiber 10 and reflected by the first dichroic filter 152 is directed outwards of the optical fiber 10, towards the first photodetector 30 that is coupled to it. The first photodetector 30 and the first face 151 of the first notch 15 are positioned relative to one another so that the first received beam, reflected by the first dichroic filter 152, passes through the optical cladding 12 and is directed towards the first photodetector 30.

The first photodetector 30 is preferably positioned relative to the optical fiber 10 so that the set of rays forming the first received beam is totally, or almost totally, received by the photodetector.

Such an arrangement of the first photodetector 30 opposite the optical fiber 10 and the first face 151 of the first notch 15 makes it possible to transmit the first received beam in the first photodetector 30 with an optimal coupling.

In the non-limiting example of FIG. 1, the first face 151 of the first notch 15 has an inclination in the same direction as the mirror 141 of the first end surface 14. Thus, the first light source 20 and the first photodetector 30 are disposed on the same side as the optical fiber 10. Such an arrangement contributes to reducing the final size of the transceiver.

In another example of embodiment (not shown), the first face 151 of the first notch 15 has an inclination in the direction opposite to the mirror 141 of the first end surface 14. Thus, the first light source 20 and the first photodetector 30 are disposed diametrically opposite with respect to the optical fiber 10.

In an alternative embodiment of the invention, illustrated by FIGS. 2 to 5, the optical fiber 10 comprises a second notch 16. The second notch 16 is also preferably produced at a distance from the first end surface 14.

Just like the first notch 15, the second notch 16 is preferably a transverse notch. The second notch 16 extends also preferably from the outer surface 121 of the optical cladding 12 to the core 11 of the optical fiber 10.

Figure 2:
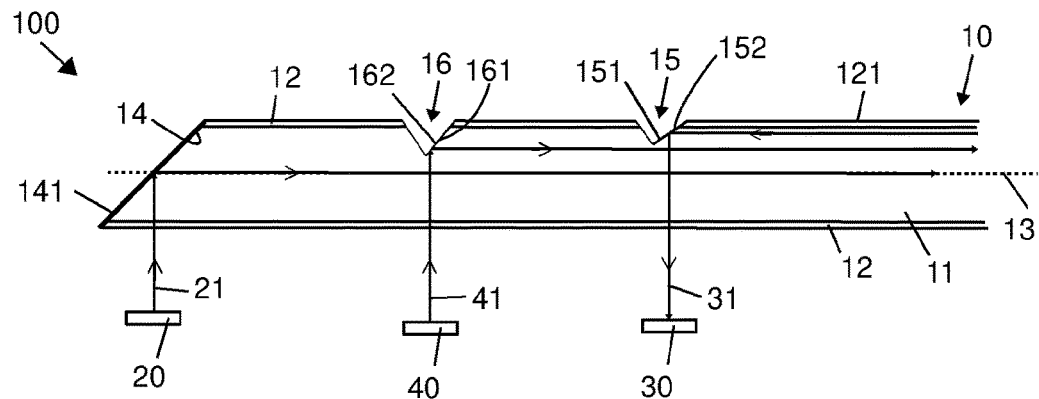
FIG. 2 is a schematic representation, in sectional view, of an optical transceiver according to an alternative embodiment of the invention.

In the non-limiting example of FIG. 2, the second notch 16 has a V-shaped straight section.

The second notch 16 comprises a first face 161 inclined with respect to the optical axis 13 of the optical fiber 10.

The first face 161 of the second notch 16 comprises a dichroic filter, called second dichroic filter 162. This second dichroic filter 162 is advantageously configured to reflect a light beam of wavelength $\lambda_3$. The wavelength equal to $\lambda_3$, is different from the wavelengths $\lambda_1$ of the first emitted beam and $\lambda_2$ of the first received beam.

Figure 3:
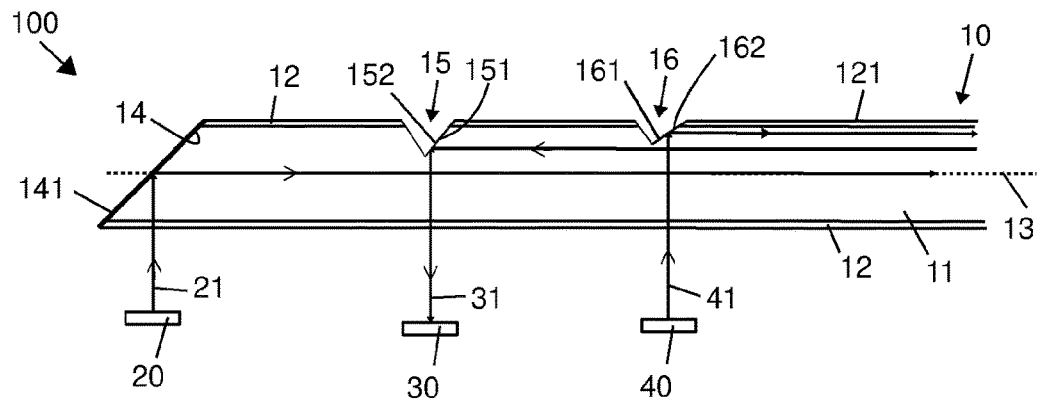
FIG. 3 is a schematic representation, in sectional view, of an optical transceiver according to another alternative embodiment of the invention.

In a first version of embodiment of this variant, illustrated by FIGS. 2 and 3, the first face 161 of the second notch 16 is intended to be optically coupled with a second light source 40.

The second light source 40 is preferably a monochromatic source. It is configured to emit a light beam, called second emitted beam, of wavelength $\lambda_3$.

In a preferred example of embodiment, the second emitted beam at the output of the second light source 40 is a divergent beam and is in the form of a diffusion cone.

In an alternative embodiment, a lens may be disposed at the output of the second light source 40, to collimate the second emitted beam.

Generally, any light source may be used for the second light source, such as for example the LED, the laser diodes or the VCSEL. Nevertheless, as for the first light source 20, preference will advantageously be given to the use of surface-emitting light sources.

The second light source 40 is intended to be positioned facing the optical cladding 12 of the optical fiber 10. The second light source 40 is disposed opposite the optical fiber 10 substantially diametrically opposite the second notch 16 produced in the optical fiber 10.

The first face 161 of the second notch 16 is inclined with respect to the optical axis 13 of the optical fiber 10 such that the second emitted beam, after having passed through the optical cladding 12, is directed towards the first face 161 of the second notch 16 to be reflected there by the first dichroic filter 152 and to propagate in the core 11 of the optical fiber 10.

In FIGS. 2 and 3, still in the interest of clarity, only one ray 41 of the second emitted beam is shown, in this case that located on a central axis of the second emitted beam. An arrow indicates the direction of propagation of this ray 41.

The second light source 40 is preferably positioned relative to the optical fiber 10 so that the set of rays forming the second emitted beam, regardless of whether it is divergent or collimated, is partially or totally reflected by the second dichroic filter 162.

Such an arrangement of the second light source 40 opposite the optical fiber 10 makes it possible to transmit the second emitted beam in the optical fiber 10 with an optimal coupling.

In one embodiment, illustrated in FIG. 2, the second notch 16 is located between the first end surface 14 and the first notch 15. In such a configuration, the first dichroic filter 152 of the first notch 15 is preferably configured to allow the rays from the first emitted beam, of wavelength $\lambda_1$, and the rays from the second emitted beam, of wavelength $\lambda_3$, to pass through. The second dichroic filter 162 of the second notch 16 is preferably configured to allow the rays from the first emitted beam, of wavelength $\lambda_1$, to pass through.

In another embodiment, illustrated in FIG. 3, the first notch 15 is located between the first end surface 14 and the second notch 16. In such a configuration, the first dichroic filter 152 of the first notch 15 is preferably configured to allow the rays from the first emitted beam, of wavelength $\lambda_1$, to pass through. The second dichroic filter 162 of the second notch 16 is preferably configured to allow the rays from the first emitted beam, of wavelength $\lambda_1$, and the rays from the first received beam, of wavelength $\lambda_2$, to pass through.

Figure 4:
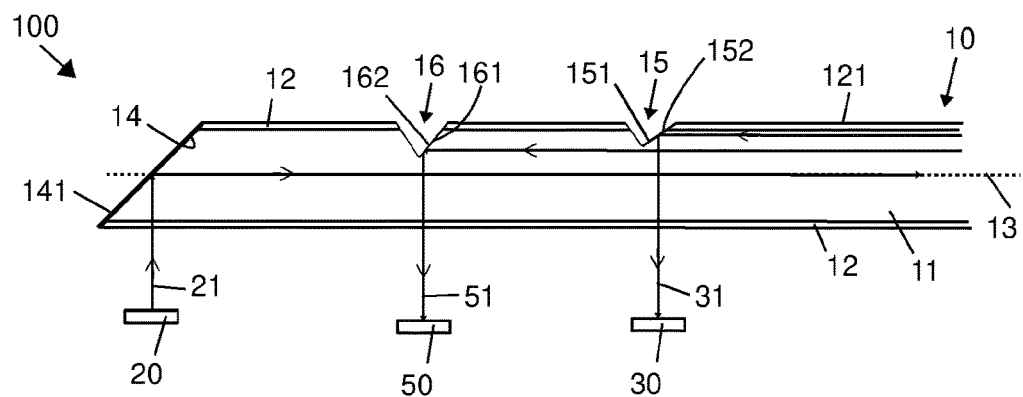
FIG. 4 is a schematic representation, in sectional view, of an optical transceiver according to another alternative embodiment of the invention.
Figure 5:
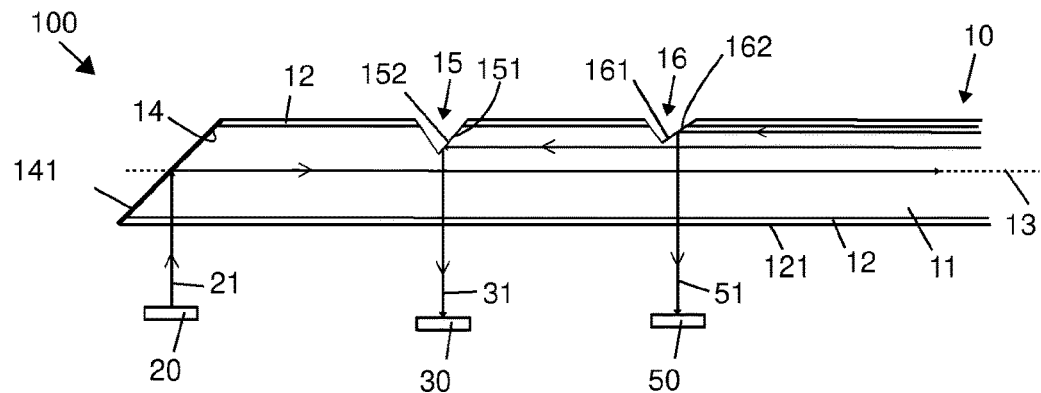
FIG. 5 is a schematic representation, in sectional view, of an optical transceiver according to another alternative embodiment of the invention.

In a second version of embodiment of the variant, illustrated by FIGS. 4 and 5, the first face 161 of the second notch 16 is intended to be optically coupled with a second photodetector 50.

The second photodetector 50 is positioned facing the optical cladding 12 of the optical fiber 10.

The second photodetector 50 is disposed opposite the optical fiber 10 substantially diametrically opposite the second notch 16 produced in the optical fiber 10.

The second photodetector 50 is advantageously configured to detect a second received beam, of wavelength $\lambda_3$.

The first face 161 of the second notch 16 is inclined, with respect to the optical axis 13 of the optical fiber 10, such that the second received beam coming from the optical fiber 10 and reflected by the second dichroic filter 162 is directed outwards of the optical fiber 10, towards the second photodetector 50 that is coupled to it.

The second photodetector 50 and the first face 161 of the second notch 16 are positioned relative to one another so that the second received beam, reflected by the second dichroic filter 162, passes through the optical cladding 12 and is directed towards the second photodetector 50.

In FIGS. 4 and 5, only one arbitrary ray 51 of the second received beam is shown. An arrow indicates the direction of propagation of this ray 51.

The second photodetector 50 is preferably positioned relative to the optical fiber 10 so that the set of rays forming the second received beam is totally, or almost totally, received by the photodetector 50. Such an arrangement of the second photodetector 50 opposite the optical fiber 10 and the first face 161 of the second notch 16 makes it possible to transmit the second received beam in the second photodetector 50 with an optimal coupling.

In one embodiment, illustrated in FIG. 4, the second notch 16 is located between the first end surface 14 and the first notch 15. In such a configuration, the first dichroic filter 152 of the first notch 15 is preferably configured to allow the rays from the first emitted beam, of wavelength $\lambda_1$, and the rays from the second received beam, of wavelength $\lambda_3$, to pass through. The second dichroic filter 162 of the second notch 16 is preferably configured to allow the rays from the first emitted beam, of wavelength $\lambda_1$, to pass through.

In another embodiment, illustrated in FIG. 5, the first notch 15 is located between the first end surface 14 and the second notch 16. In such a configuration, the second dichroic filter 152 of the first notch 15 is preferably configured to allow the rays from the first emitted beam, of wavelength $\lambda_1$, to pass through. The second dichroic filter 162 of the second notch 16 is preferably configured to allow the rays from the first emitted beam, of wavelength $\lambda_1$, and the rays from the first received beam, of wavelength $\lambda_2$, to pass through.

Regardless of the version produced, the first face 151 of the first notch 15 and the first face 161 of the second notch 16 are preferably produced substantially on the same side of the optical fiber 10, and have an inclination in the same direction as the mirror 141 of the first end surface 14. Thus, the first light source 20, the first photodetector 30 and the second light source 40, or the second photodetector 50, are disposed in a same plane, and substantially aligned. Such an arrangement contributes to reducing the final size of the transceiver.

Figure 6:
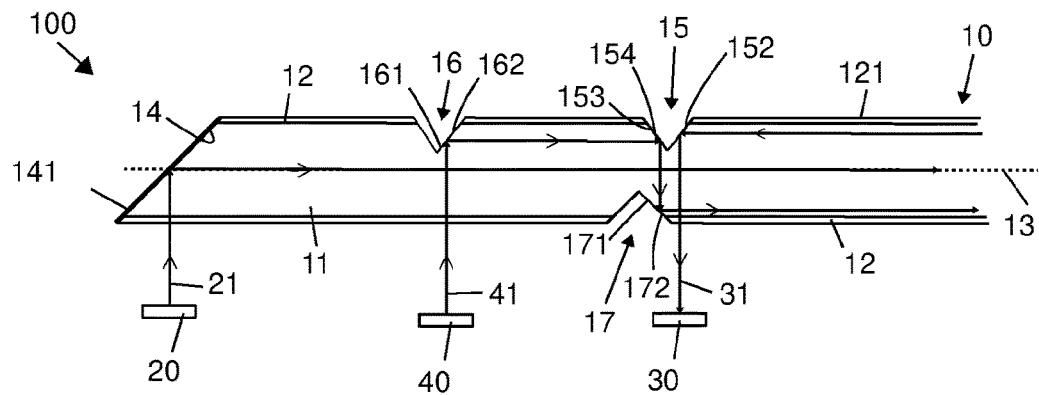
FIG. 6 is a schematic representation, in sectional view, of an optical transceiver according to another alternative embodiment of the invention
Figure 7:
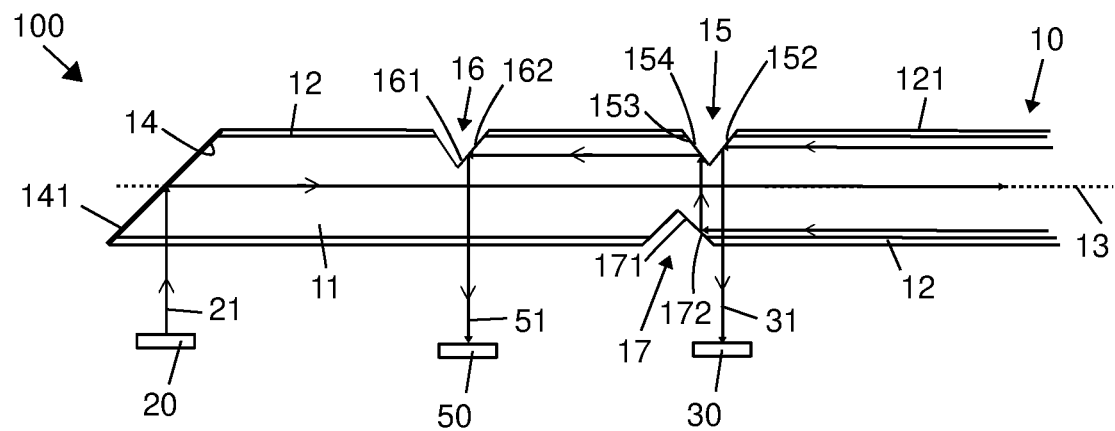
FIG. 7 is a schematic representation, in sectional view, of an optical transceiver according to another alternative embodiment of the invention.

In an alternative embodiment of the transceiver, illustrated in FIGS. 6 and 7, the optical fiber comprises a third notch 17. The third notch 17 is also preferably produced at a distance from the first end surface 14.

Just like the first notch 15 or the second notch 16, the third notch 17 is preferably a transverse notch. The third notch 17 extends also preferably from the outer surface 121 of the optical cladding 12 to the core 11 of the optical fiber 10.

In the non-limiting example of FIG. 6, the third notch 17 has a V-shaped straight section.

The third notch 17 comprises a first face 171 inclined with respect to the optical axis 13 of the optical fiber 10.

The first face 171 of the third notch 17 comprises a dichroic filter, called third dichroic filter 172. This third dichroic filter 172 is advantageously configured to reflect a light beam of wavelength $\lambda_3$, like for the second dichroic filter 162.

In one embodiment, illustrated in FIGS. 6 and 7, the second notch 16 is located between the first end surface 14 and the first notch 15.

The first notch 15 comprises a second face 153 inclined with respect to the optical axis 13 of the optical fiber 10.

The second face 153 of the first notch 15 comprises a dichroic filter, called fourth dichroic filter 154. This fourth dichroic filter 154 is advantageously configured to reflect a light beam of wavelength $\lambda_3$, like for the second dichroic filter 162 and the third dichroic filter 172. The first face 171 of the third notch 17 is substantially arranged diametrically opposite the second face 153 of the first notch 15. The first face 161 of the second notch 16, the second face 153 of the first notch 15 and the first face 171 of the third notch 17 are arranged relative to one another such that:
  when the first face 161 of the second notch 16 is intended to be optically coupled with the second light source 40, the second emitted beam, after having passed through the optical cladding 12, is directed towards the first face 161 of the second notch 16 to be reflected there by the first dichroic filter 152, then reflected by the fourth dichroic filter 154, then reflected by the third dichroic filter 172 and to propagate in the core 11 of the optical fiber 10 (FIG. 6),
  when the first face 161 of the second notch 16 is intended to be optically coupled with the second photodetector 50, a portion of the second received beam is reflected by the third dichroic filter 172, then reflected by the fourth dichroic filter 154, then reflected by the second dichroic filter 162, passes through the optical cladding 12 and is directed towards the second photodetector 50 (FIG. 7).

Figure 8:
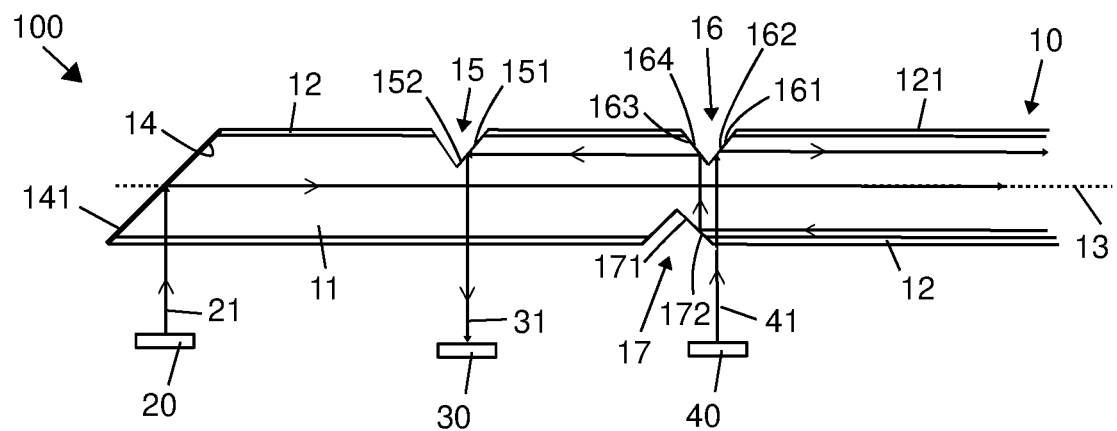
FIG. 8 is a schematic representation, in sectional view, of an optical transceiver according to another alternative embodiment of the invention.

In one embodiment, illustrated in FIG. 8, the first notch 15 is located between the first end surface 14 and the second notch 16.

The second notch 16 comprises a second face 163 inclined with respect to the optical axis 13 of the optical fiber 10.

The second face 163 of the second notch 16 comprises a dichroic filter, called fifth dichroic filter 164. This fifth dichroic filter 164 is advantageously configured to reflect a light beam of wavelength $\lambda_3$, like for the second dichroic filter 162 and the third dichroic filter 172. The first face 171 of the third notch 17 is substantially arranged diametrically opposite the second face 163 of the second notch 16. The first face 151 of the first notch 15, the second face 163 of the second notch 16 and the first face 171 of the third notch 17 are arranged relative to one another such that a portion of the first received beam is then reflected by the third dichroic filter 172, then reflected by the fifth dichroic filter 164, then reflected by the first dichroic filter 152, passes through the optical cladding 12 and is directed towards the first photodetector 30.

In another alternative embodiment (not illustrated) of the transceiver, the optical fiber 10 may have instead of the first notch 15 and/or of the second notch 16, a cut separating the optical fiber 10 into two adjacent sections. At the cut replacing the first notch 15, the first dichroic filter 152 is applied on one of the two opposite faces delimiting the cut. The face on which the first dichroic filter 152 is applied is inclined, with respect to the optical axis 13 of the optical fiber 10, in an identical way to the first face 151 of the first notch 15, such that the first received beam coming from the optical fiber 10 and reflected by the first dichroic filter 152 is directed outwards of the optical fiber 10, towards the first photodetector 30 that is coupled to it.

At the cut replacing the second notch 16, the second dichroic filter 162 is applied on one of the two opposite faces delimiting the cut. The face on which the first dichroic filter 152 is applied is inclined, with respect to the optical axis 13 of the optical fiber 10, in an identical way to the first face 161 of the second notch 16.

The number of light sources, of photodetectors and of notches and/or cuts in the optical fiber 10 is not limited to the examples described above. It is possible without departing from the scope of the invention, to add as many light sources, photodetectors and notches and/or associated cuts as necessary, according to the desired application.

An example of assembly of an optical fiber 10, of a first light source 20 and of a first photodetector 30, in view of producing a compact optical transceiver, is now described, by way of non-limiting example.

The optical fiber 10 is prepared. The first notch 15, particularly its shape and its depth, and the polishing of the first end surface 14 are performed for example by conventional micro-machining techniques.

A first deposit, preferably of gold, is performed on the first end surface 14 in view of forming the mirror 141.

A surface treatment is performed on the first face 151 of the first notch 15 in view of forming the first appropriate dichroic filter 152.

Once prepared, the optical fiber 10 is held in place in a groove, for example V-shaped, made in a first substrate. The optical fiber 10 is held in place for example by gluing. The first substrate is preferably a support made of ceramic or made of silicon.

On a second substrate, are attached the optical components, namely the first light source 20 and the first photodetector 30. The first light source 20 is preferably a surface-emitting source. The second substrate is preferably a support made of ceramic or made of silicon. The second substrate may advantageously be used as a support for the electronic power supply and control circuits of the optical components. The optical components are preferably glued to the second substrate.

In one example of embodiment, the adhesive is a thixotropic conductive adhesive. Such an adhesive has a good thermal and electrical conductivity.

The optical components are disposed on the second substrate in such a way that, when the first substrate comes to be positioned opposite the second substrate:
  the first light source 20 is disposed facing the cladding of the optical fiber 10 and arranged opposite the first end surface 14 of the optical fiber 10, so that the first emitted beam is directed towards the first mirror 141, and
  the first photodetector 30 is disposed facing the cladding of the optical fiber 10, diametrically opposite the first notch 15, so that the first received beam is reflected by the first dichroic filter 152 in the direction of the first photodetector 30.

Shims may be interposed between the first substrate and the second substrate, on either side of the optical fiber 10 and of the optical components, to guarantee a spacing between said optical components and said optical fiber 10.

In one example of embodiment, the shims are for example made of non-conductive polymer materials.

The first substrate and the second substrate are held opposite one another for example by an adhesive, preferably of the same refractive index as that of the optical cladding 12.

With such an optical transducer, the optical fiber 10 is as close as possible to the optical components, the optical couplings are thus optimal.

In a preferred application of the optical transceiver 100, said optical transceiver is disposed in an aircraft and may be associated with equipment such as equipment known under the acronym PSU (Passenger Service Unit), particularly making it possible for a passenger to trigger calls to the cabin crew or to switch on/off a reading light.

The optical transceiver 100 may then advantageously be intended on the one hand to transmit data, via Li-Fi (acronym of Light Fidelity) technology, and to provide ambient lighting. The transmission of data, by Li-Fi technology, extends both in the direction of a downward flow (towards the passenger) and in the direction of an upward flow (coming from the passenger).

The first light source 20 of the optical transceiver 100 is configured to emit the first emitted beam at a wavelength $\lambda_1$ located in the infrared range. Infrared range means the range of wavelengths between 780 nm and 2 µm.

The second light source 40 of the optical transceiver 100 is configured to emit the second emitted beam at a wavelength $\lambda_3$ located for example in the blue range. Blue range means the range of wavelengths between 450 and 500 nm.

The first photodetector 30 of the optical transceiver 100 is configured to detect the first received beam at a wavelength $\lambda_2$ also located in the infrared range.

An optical module, at the output of the optical fiber 10 of the optical transceiver 100, may subsequently make it possible on the one hand to diffuse the first emitted beam, intended to transmit data towards the passenger, and on the other hand to convert the second emitted beam into an illumination beam. The optical module may also make it possible to transmit, in the optical fiber 10 of the optical transceiver 100, the first received beam containing the data coming from the passenger.

The description above clearly illustrates that, through its various features and their advantages, the present invention achieves the objectives that it sets itself. In particular, it proposes an optical transceiver of small size and at low cost. The optical transceiver proposes a simple configuration, which does not require additional optical components other than the light sources and photodetectors. The machining of the optical fiber and the positioning of the light sources and photodetectors opposite the optical fiber ensure the transmission and reception of the light beams.

The invention claimed is:

1. An optical emitter-receiver module comprising:
a first light source;
a first photodetector;
a multimode glass optical fiber, the first light source being configured to emit a first emitted beam at a first wavelength, the multimode glass optical fiber comprising:
a core; an optical cladding; an optical axis; a first end surface, inclined at an angle of 45° with respect to the optical axis of the multimode glass optical fiber, comprising a mirror; and a first notch, extending from an outer surface of the optical cladding to the core of the multimode glass optical fiber, comprising a first face comprising a first dichroic filter configured to reflect a first received beam of wavelength equal to a second wavelength, the second wavelength being different from the first wavelength;
the first light source being arranged relative to the mirror such that the first emitted beam, emitted by the first light source passes through the optical cladding, is reflected by the mirror and is transmitted in the multimode glass optical fiber;
the first photodetector and the first face of the first notch being positioned relative to one another such that the first received beam reflected by the first dichroic filter passes through the optical cladding and is directed towards the first photodetector; and
wherein the multimode glass optical fiber further comprises a second notch, extending from an outer surface of the optical cladding to the core of the multimode glass optical fiber, comprising a first face comprising a second dichroic filter configured to reflect a light beam at a third wavelength, the third wavelength being different from the first wavelength and from the second wavelength.

2. The optical emitter-receiver module of claim 1, further comprising a second light source configured to emit a second beam at the third wavelength, the second light source and the first face of the second notch are positioned relative to one another such that the second emitted beam, emitted by the second light source passes through the optical cladding, is reflected by the second dichroic filter and is transmitted in the multimode glass optical fiber.

3. The optical emitter-receiver module of claim 1, further comprising a second photodetector configured to detect a light beam at the third wavelength, the second photodetector and the first face of the second notch are positioned relative to one another such that the light beam at the third wavelength reflected by the second dichroic filter passes through the optical cladding and is directed towards the second photodetector.

4. The optical emitter-receiver module of claim 2, wherein the first light source, the first photodetector or the second light source are disposed in the same plane.

5. The optical emitter-receiver module of claim 1, wherein the multimode glass optical fiber comprises a cut separating the multimode glass optical fiber into two adjacent sections, one of faces opposite the cut comprising a dichroic filter configured to reflect a light beam at a predefined wavelength.

6. The optical emitter-receiver module of claim 1, wherein the first notch is produced by laser micro-machining of the multimode glass optical fiber.

7. The optical emitter-receiver module of claim 3, wherein the first light source, the first photodetector or the second photodetector are disposed in the same plane.

* * * * *